United States Patent
Xiang

(10) Patent No.: US 9,338,420 B2
(45) Date of Patent: May 10, 2016

(54) VIDEO ANALYSIS ASSISTED GENERATION OF MULTI-CHANNEL AUDIO DATA

(71) Applicant: QUALCOMM Incorporated, San Diego, CA (US)

(72) Inventor: Pei Xiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/831,018

(22) Filed: Mar. 14, 2013

(65) Prior Publication Data

US 2014/0233917 A1    Aug. 21, 2014

Related U.S. Application Data

(60) Provisional application No. 61/765,556, filed on Feb. 15, 2013.

(51) Int. Cl.
  *H04N 9/87* (2006.01)
  *G11B 27/031* (2006.01)
  *G11B 27/28* (2006.01)
  (Continued)

(52) U.S. Cl.
  CPC ............. *H04N 9/87* (2013.01); *G10L 19/008* (2013.01); *G10L 25/48* (2013.01); *G11B 27/031* (2013.01); *G11B 27/28* (2013.01); *H04S 3/008* (2013.01);
  (Continued)

(58) Field of Classification Search
  CPC ........ H04N 9/87; G11B 27/031; G11B 27/28; G10L 19/008; G10L 25/48; H04S 3/008; H04S 7/30; H04S 2400/11; H04S 2420/03

USPC .......................................................... 386/285
See application file for complete search history.

(56) References Cited

U.S. PATENT DOCUMENTS

2003/0053680 A1* 3/2003 Lin ........................ H04S 5/005
                                                              382/154
2010/0098258 A1   4/2010 Thorn
(Continued)

FOREIGN PATENT DOCUMENTS

| WO | 2010070556 A2 | 6/2010 |
| WO | 2010140254 A1 | 12/2010 |
| WO | 2012063103 A1 | 5/2012 |

OTHER PUBLICATIONS

"Sony ECMCQP1 Wide Stereo Microphone for DCRHC20/30/40, DCRVX2100 & HDRFX1", Amazon, accessed on Jul. 26, 2012, 4 pp. URL: http://www.amazon.com/Sony-ECMCQP1-Microphone-DCRHC20-DCRVX2100/dp/B0002O01GC/ref=sr_1_1?s=electronics&ie=UTF8&qid=1343253770&sr=1-1&keywords=ecmcqp1.

(Continued)

*Primary Examiner* — Thai Tran
*Assistant Examiner* — Nien-Ru Yang
(74) *Attorney, Agent, or Firm* — Shumaker & Sieffert, P.A.

(57) ABSTRACT

In general, techniques are described for capturing multi-channel audio data. A device comprising one or more processors may be configured to implement the techniques. The processors may analyze captured audio data to identify audio objects, and analyze video data captured concurrent to the capture of the audio data to identify video objects. The processors may then associate at least one of the audio objects with at least one of the video objects, and generate multi-channel audio data from the audio data based on the association of the at least one of audio objects with the at least one of the video objects.

28 Claims, 8 Drawing Sheets

(51) Int. Cl.
  *G10L 19/008* (2013.01)
  *H04S 3/00* (2006.01)
  *H04S 7/00* (2006.01)
  *G10L 25/48* (2013.01)

(52) U.S. Cl.
  CPC .............. *H04S 7/30* (2013.01); *H04S 2400/11* (2013.01); *H04S 2420/03* (2013.01)

(56) References Cited

U.S. PATENT DOCUMENTS

| | | | |
|---|---|---|---|
| 2010/0272297 A1* | 10/2010 | Boretzki | ................ 381/312 |
| 2011/0069229 A1 | 3/2011 | Lord | |
| 2011/0292162 A1* | 12/2011 | Byun et al. | ................ 348/14.08 |
| 2012/0013768 A1 | 1/2012 | Zurek et al. | |
| 2012/0019689 A1 | 1/2012 | Zurek et al. | |
| 2012/0062700 A1* | 3/2012 | Antonellis et al. | ............. 348/43 |
| 2012/0092555 A1* | 4/2012 | Crockett | .............. G06F 9/4881 348/563 |
| 2012/0128160 A1 | 5/2012 | Kim et al. | |
| 2012/0128166 A1* | 5/2012 | Kim et al. | ................ 381/58 |
| 2012/0128175 A1 | 5/2012 | Visser et al. | |
| 2013/0162752 A1* | 6/2013 | Herz et al. | ................ 348/14.08 |

OTHER PUBLICATIONS

Ellis, "Prediction-driven Computational Auditory Scene Analysis", Massachusetts Institute of Technology, Jun. 1996, 180 pp.

Martin et al., "Effective Real-Time Visual Object Detection", Proceedings of the 5th Workshop on Humanoid Soccer Robots at Humanoids 2010, Nashville (USA), Dec. 7, 2010, 6 pp.

Potard et al., "Decorrelation Techniques for the Rendering of Apparent Sound Source Width in 3D Audio Displays", Proceeding of the 7th International Conference on Digital Audio Effects (DAFx'04), Naples, Italy, Oct. 5-8, 2004, 5 pp.

"Auditory Scene Analysis," Wikipedia: the free encyclopedia, accessed on Jul. 26, 2012, 3 pp. URL: http://en.wikipedia.org/wiki/Auditory_scene_analysis.

"Outline of object recognition," Wikipedia: the free encyclopedia, accessed on Jul. 26, 2012, 10 pp. URL: http://en.wikipedia.org/wiki/Object_recognition.

International Search Report and Written Opinion—PCT/US2014/016059—ISA/EPO—Apr. 17, 2014, 12 pp.

International Preliminary Report on Patentability from International Application No. PCT/US2014/016059, dated Jun. 4, 2015, 10 pps.

* cited by examiner

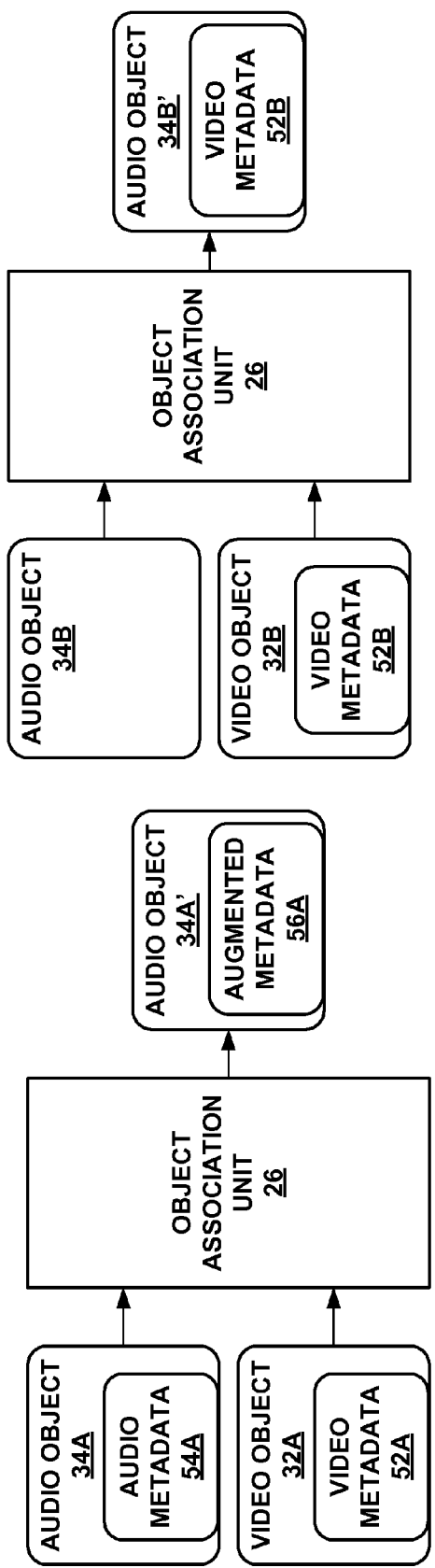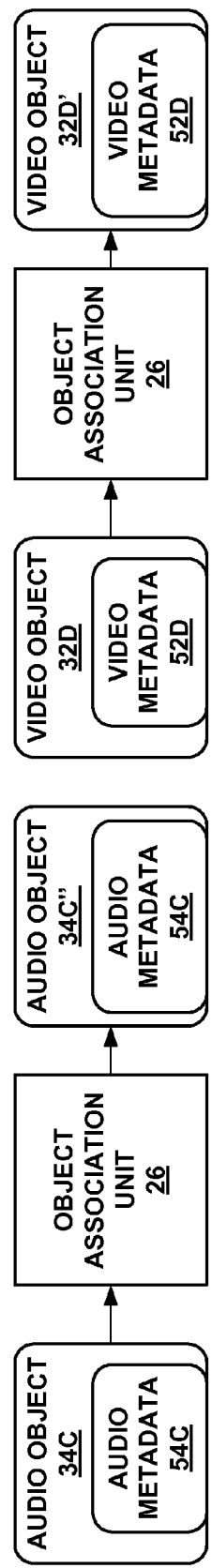

VIDEO ANALYSIS ASSISTED GENERATION OF MULTI-CHANNEL AUDIO DATA

This application claims the benefit of U.S. Provisional Application No. 61/765,556, filed Feb. 15, 2013.

TECHNICAL FIELD

The disclosure relates to capturing audio data and, more particularly, capturing multi-channel audio data.

BACKGROUND

Typically, video capture devices, such as video camcorders, tablet or slate computers, mobile phones (including so-called "smart phones"), personal gaming devices, personal media devices and the like, feature a camera to capture a series of images at a given frame rate to generate video data. Often, these video capture devices feature a microphone to capture monaural audio data of the scene portrayed in the video data. More sophisticated video capture devices may feature two or more microphones to increase the number of audio channels (from the single channel in monaural audio data) capable of being captured. These more sophisticated video recording devices may include at least two microphones to capture stereo audio data (which refers to audio data having a left and right channel).

Given the rise in adoption of so-called smart phones, smart phones are increasingly becoming the predominant way by which video data is captured. Often, due to the nature of smart phones and their use as audio communication devices, smart phones may include two, three, four or even five microphones. The additional microphones may be employed by the smart phone for purposes of noise cancellation during phone calls, video conferences or other forms of communication including audio communication. Although smart phones feature a large number of microphones, these microphones are not commonly employed to capture multi-channel audio data other than stereo audio data because these microphones are often placed in locations on the smart phones that limit their ability to adequately capture anything other than stereo audio data.

SUMMARY

In general, this disclosure describes techniques by which a video capture device may use video analysis to assist in the capture of multi-channel audio data. A video capture device may facilitate the generation of surround sound audio data (often having five or more channels) using video scene analysis (or computer-vision) techniques. In some examples, a video capture device may capture both audio data and video data, processing the video data to identify video objects while also processing the audio data to identify audio objects. The video capture device may perform video scene analysis techniques to identify these video objects and generate various metadata regarding these objects. The video capture device may also perform auditory scene analysis in an attempt to identify the audio objects and various metadata regarding these objects. By comparing these objects, the video capture device may identify those video objects that are likely to be the sources of the audio objects.

Given that video analysis techniques may more closely identify the location of the video objects relative to the video capture device in comparison to the audio objects alone, the video capture device may better localize the audio objects in comparison to relying solely on often inaccurate beam-forming techniques. These audio objects may then be rendered to one or more channels using decibel differences that better localize the audio objects to one or more front channels, thereby enabling better generation of surround sound audio data in comparison to that generated by conventional video capture devices.

In one aspect, a method comprises analyzing audio data captured with a device to identify one or more audio objects and analyzing video data captured with the device concurrent to the capture of the audio data to identify one or more video objects. The method further comprises associating at least one of the one or more audio objects with at least one of the one or more video objects, and generating multi-channel audio data from the audio data based on the association of the at least one of the one or more audio objects with the at least one of the one or more video objects.

In another aspect, a device comprises one or more processors configured to obtain an audio object, obtaining a video object, associate the audio object and the video object, compare the audio object to the associated video object and render the audio object based on the comparison between the audio object and the associated video object.

In another aspect, a device that generates an audio output signal comprises means for identifying a first audio object associated with a first video object counterpart based on a first comparison of a data component of the first audio object and a data component of the first video object, and means for identifying a second audio object not associated with a second video object counterpart based on a second comparison of a data component of the second audio object and a data component of the second video object. The device further comprises means for rendering the first audio object in a first zone, means for rendering the second audio object in a second zone, and means for generating the audio output signal based on combining the rendered first audio object in the first zone and the rendered second audio object in the second zone.

In another aspect, a non-transitory computer-readable storage medium has stored thereon instructions that, when executed cause one or more processors of a device to analyze audio data captured with the device to identify one or more audio objects, analyze video data captured with the device concurrent to the capture of the audio data to identify one or more video objects, associate at least one of the one or more audio objects with at least one of the one or more video objects, and generate multi-channel audio data from the audio data based on the association of the at least one of the one or more audio objects with the at least one of the one or more video objects.

The details of one or more aspects of the techniques are set forth in the accompanying drawings and the description below. Other features, objects, and advantages of the techniques will be apparent from the description and drawings, and from the claims.

BRIEF DESCRIPTION OF DRAWINGS

FIGS. 2A-2D are diagrams illustrating operations performed by the video capture device of FIG. 1 in associating video objects with audio objects in accordance with the techniques described in this disclosure.

DETAILED DESCRIPTION

Figure 1A:
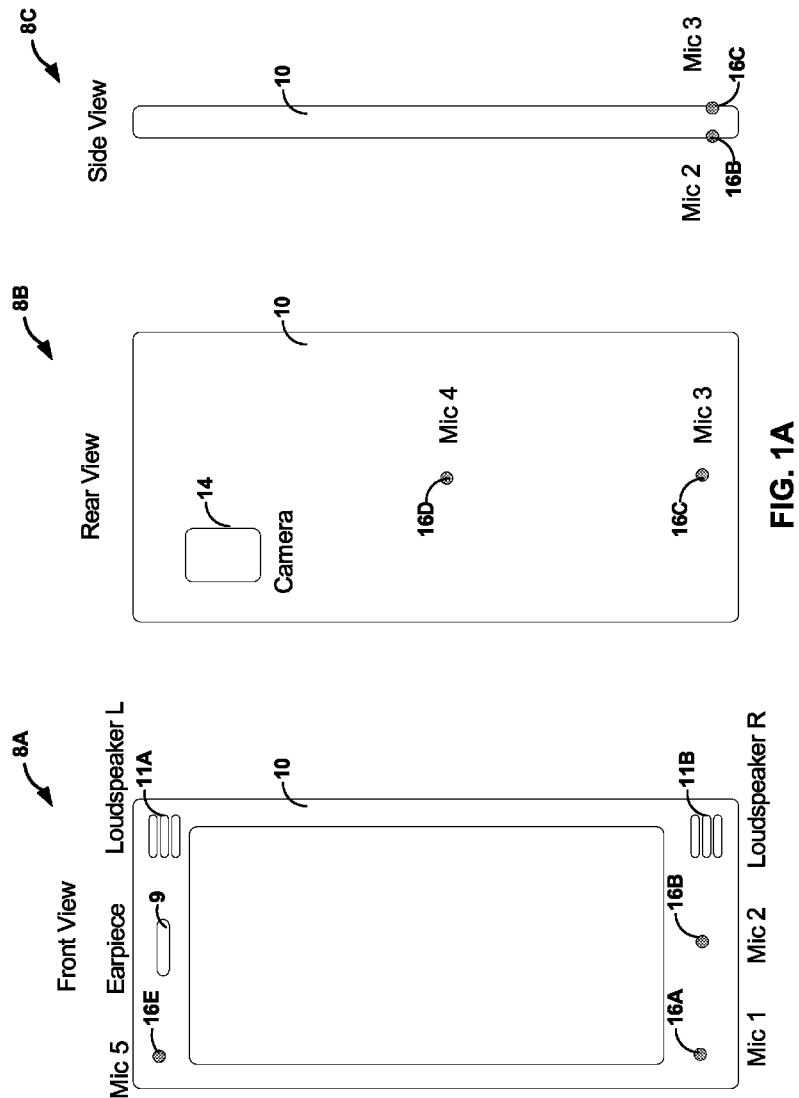
FIG. 1A is a diagram illustrating various views of an example video capture device 10 that performs the techniques described in this disclosure.

FIG. 1A is a diagram illustrating various views 8A-8C (front, rear and side, respectively) of an example video capture device 10 that performs the techniques described in this disclosure. Video capture device 10 may represent any type of device capable of capturing video and audio data, such as a video camcorder, a tablet or slate computer, a mobile phone (including a so-called "smart phone"), a personal gaming device, a personal media device and the like. For purposes of illustration, video capture device 10 is assumed to represent a smart phone. Although described with respect to a particular type of device, i.e., a smart phone, in this disclosure, the techniques may be implemented by any type of device capable of capturing video data and multi-channel audio data.

In the example of FIG. 1A, video capture device 10 is shown from three different views 8A-8C. View 8A shows video capture device 10 from the front. View 8B shows video capture device 10 from the rear. View 8C shows video capture device 10 from the side.

As shown in view 8A, video capture device 10 includes an earpiece 9, loudspeakers 11A, 11B and microphones 16A, 16B and 16E. Earpiece 9 represents a small speaker used for reproduction of sound or audio data when listening to the audio with device 10 close to an ear of a user. Loudspeakers 11A and 11B each represent loudspeakers used for reproduction of sound or audio data when listening to the audio with device 10 farther from the user (such as when used to reproduce music, watch video or as a speakerphone). Loudspeaker 11A may be referred to as a left loudspeaker 11A (or "loudspeaker L") in that loudspeaker 11A may reproduce a left channel of multi-channel audio data. Loudspeaker 11B may be referred to as a right loudspeaker 11A (or "loudspeaker R") in that loudspeaker 11B may reproduce a right channel of multi-channel audio data. Microphones 16A, 16B and 16E are described in more detail below.

As shown in view 8B, in one example, video capture device 10 also includes camera 14 and microphones 16C and 16D. Camera 14 may represent any type of device capable of capturing an image. Camera 14 may capture a series of images at a given rate (which is commonly referred to as a "frame rate") so as to form video data. Camera 14 may include a lens and other components that may facilitate the capture of light so as to generate or otherwise produce an image. Camera 14 may also interface with a flash or other light producing element (which is not shown in the example of FIG. 1A), where, in some instances, camera 14 may be integrated with the flash. In the assumed context of a smart phone, camera 14 typically comprises a digital camera that includes a light sensing sensor (such as complementary metal-oxide-semiconductor (CMOS) light image sensor or a charge-coupled device (CCD) image sensor) to sense the luminosity and chromacity of light entering the lens, as opposed to a celluloid medium for sensing light that is common in film cameras. Camera 14 may capture light and produce a series of images, which is shown as video data 18 in the example of FIG. 1B below.

Microphones 16A-16E ("microphones 16") may each represent any type of device capable of capturing audio data. Microphones 16 may generally refer to any type of acoustic-to-electric transducer or sensor that is capable of converting sound into an electrical signal. There are a number of different types of microphones, each of which varies in the way the different types capture sound. To provide a few examples, microphones 16 may include dynamic microphones (which refers to microphones that capture sound using electromagnetic induction), condenser microphones (which refer to microphones that capture sound using capacitance change), and piezoelectric microphones. While shown as incorporated within or internal to video capture device 10, one or more of microphones 16 may be external to video capture device 10 and coupled to video capture device 10 via either a wired connection or a wireless connection. Each of microphones 16 may capture separate audio data 20A-20E, as shown in more detail with respect to the example of FIG. 1B.

Typically, video capture devices, such as video camcorders, tablet or slate computers, mobile phones (including so-called "smart phones"), personal gaming devices, personal media devices and the like, feature a camera to capture a series of images at a given frame rate to generate video data. Often, these video capture devices feature a microphone to capture monaural audio data of the scene portrayed in the video data. More sophisticated video capture devices may feature two or more microphones to increase the number of channels (from the single channel in monaural audio data) capable of being captured. These more sophisticated video recording devices may include at least two microphones to capture stereo audio data (which refers to audio data having a left and right channel).

Three or more microphones, such as the five microphones shown in FIG. 1A as microphones 16, may enable the video-capture device to perform what are referred to as "beam-forming" techniques to facilitate the capture of surround sound audio having front-back and left-right distinctions (or so-called "channels" of audio data, such as a front or center channel, a front-left channel, a front-right channel, a back-left channel and a back-right channel). After capturing the microphone signals (which may also be referred to as "audio data"), the smart phone may algorithmically form spatial beams (which may refer to a process by which sounds at certain directions are amplified) to other spatial directions. By filtering the captured sound with these beams separately, the smart phone may generate different output surround sound channels. In some examples, the smart phone may generate beams such that the different between beam regions and corresponding null beam regions exhibit a 6 dB sound level difference. As one example, the smart phone may generate 5.1 surround sound audio data based on these beams.

Although smart phones may capture surround audio using the beam-forming techniques and thereby capture more realistic audio in comparison to video-capture devices featuring only one or two microphones, often times the microphone arrangement on some smart phones, such as that shown in views 8A-8C of the example of FIG. 1A, does not allow for the best quality surround sound audio. Typically, the decibel difference for corners is not very prominent. That is, the 6 dB difference when combining beams does not create much difference such that the sound generating the identified beam does not appear, upon being played back, to be very localized. When generating the surround sound audio data, the smart phone may place what should be localized audio in both the center channel and the front-right channel, for example, when the audio should be more localized to the front-right channel.

Additionally, given the proximity between some front and back microphones, e.g., microphones 16B and 16C, smart phones may not be able to sufficiently distinguish between front and back audio. Being unable to sufficiently distinguish between front and back audio may result in the smart phone generating surround sound or multi-channel audio data that does not present sufficient distinctions in audio between front and back channels. In other words, the front and back channels may sound muddled where back sounds may be reproduced by front speakers (often, in conjunction with back sounds so as to muddle front and back) and front sounds may be reproduced by back speakers (often, in conjunction with front sounds so as to muddle front and back).

Video capture device 10 may implement the techniques described in this disclosure to facilitate the generation of surround sound or multi-channel audio data that better replicates the audio data as heard when capturing the video data. To generate this multi-channel audio data in accordance with the techniques described in this disclosure, video capture device 10 may use video analysis to assist in the capture of multi-channel audio data. Video capture device 10 may facilitate the generation of multi-channel audio data (often having five or more channels) using video scene analysis (or computer-vision) techniques. In some examples, video capture device 10 may capture both audio data and video data, processing the video data to identify video objects while also processing the audio data to identify audio objects. Video capture device 10 may perform video scene analysis techniques to identify these video objects and various metadata regarding these objects. Video capture device 10 may also perform auditory scene analysis in an attempt to identify the audio objects and various metadata regarding these objects. By comparing these objects, the video capture device may identify those video objects that are likely to be the sources of the audio objects.

Given that video analysis techniques may more closely identify the location of the video objects relative to video capture device 10 in comparison to the audio objects alone, video capture device 10 may better localize the audio objects in comparison to relying solely on often inaccurate beamforming techniques. These audio objects may then be rendered to one or more channels using decibel differences that better localize the audio objects to one of the front channels, thereby enabling better generation of surround sound or other types of multi-channel audio data in comparison to that generated by conventional video capture devices. The techniques performed by video capture device 10 are described in more detail with respect to the following FIG. 1B.

Figure 1B:
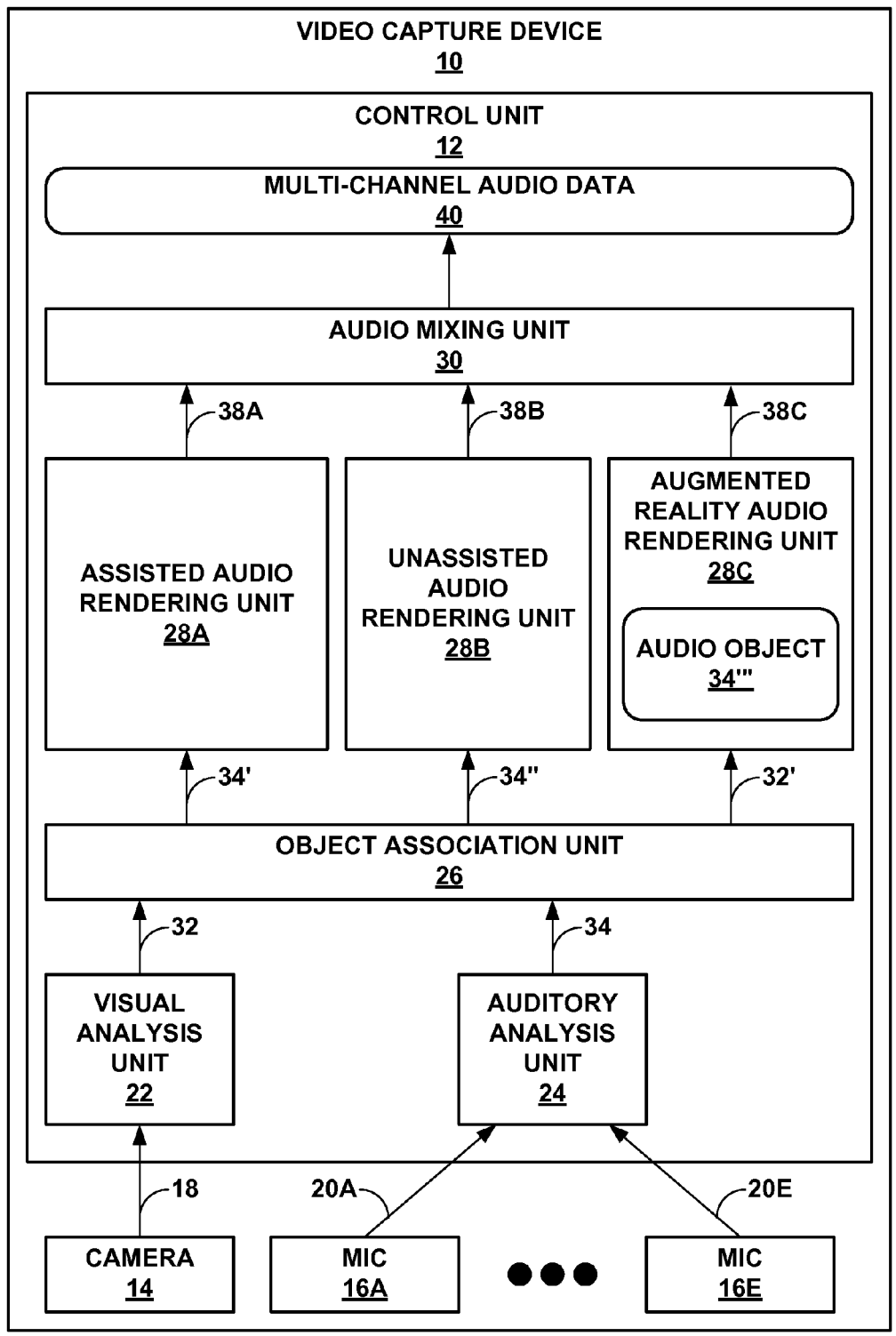
FIG. 1B is a block diagram illustrating in more detail the video capture device that performs the techniques described in this disclosure.

FIG. 1B is a block diagram illustrating in more detail video capture device 10 that performs the techniques described in this disclosure. In the example of FIG. 1B, video capture device 10 includes a control unit 12, a camera 14, and microphones ("mic") 16A-16E ("microphones 16" or "mics 16"). Although not shown in the example of FIG. 1B for ease of illustration purposes, video capture device 10 may also include earpiece 9 and loudspeakers 11A and 11B, as well as, additional modules, elements and/or unit that perform various other functions commonly associated with video capture device 10.

In any event, control unit 12 may represent one or more central processing units ("CPUs," which are not shown in FIG. 1) graphics processing units ("GPUs," which again are not shown in FIG. 1) or other processing units that execute software instructions, such as those used to define a software or computer program, stored to a non-transitory computer-readable storage medium (again, not shown in FIG. 1), such as a storage device (e.g., a disk drive, or an optical drive), or memory (such as Flash memory, random access memory or RAM) or any other type of volatile or non-volatile memory, that stores instructions to cause the one or more processing units to perform the techniques described herein.

Alternatively, or additionally, control unit 12 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Whether comprised of CPUs and/or GPUs that execute software, dedicated hardware or some combination thereof, control unit 12 may be referred to as a "processor" in some contexts.

As described above, camera 14 may represent any type of device capable of capturing an image, while microphones 16 may each represent any type of device capable of capturing audio data. Camera 14 may capture light and produce a series of images, which is shown as video data 18 in the example of FIG. 1. Each of microphones 16 may capture separate audio data 20A-20E.

As further shown in the example of FIG. 1, control unit 12 includes a visual analysis unit 22, an auditory analysis unit 24, an object association unit 26, rendering units 28A-28C ("rendering units 28") and an audio mixing unit 30. Visual analysis unit 22 may represent hardware or a combination of hardware and software that performs visual scene analysis of video data, such as video data 18. Visual scene analysis may involve aspects of computer vision, which refers to a process by which a computer or other device may process and analyze images to detect and identify various objects, elements and/or aspects of the image. Computer vision may in some instances be referred to as machine vision, as computer vision and machine vision have many overlapping or related concepts. Often, machine vision employs aspects or concepts of computer vision but in different contexts. Although the disclosure refers to computer vision when describing the techniques, the techniques may also be performed using machine vision either in conjunction with or as an alternative to computer vision. For this reason, the terms "machine vision" and "computer vision" may be used interchangeably.

Although not shown in the example of FIG. 1, visual analysis unit 22 may, in some instances, communicate with an image server or other database external from video capture device 10 when performing visual scene analysis. Visual analysis unit 22 may communicate with this image server to offload various aspects of the often resource (meaning, processing resources and/or memory resource) intensive visual scene analysis process. For example, visual analysis unit 22 may perform some initial analysis to detect objects, passing these objects to the image server for identification. The image server may then classify or otherwise identify the object, passing the classified object back to visual analysis unit 22. Typically, visual analysis unit 22 communicates with the image server via a wireless session. As such, video capture device 10 may include one or more interfaces (although not shown in the example of FIG. 1) by which video capture device 10 may communicate with peripheral devices, servers, and any other type of device or accessory either wirelessly or via a wired connection. Visual analysis unit 22 may output video objects 32 as a result of performing the visual scene analysis.

Auditory analysis unit 24 may perform auditory scene analysis of audio data, such as audio data 20A-20N ("audio data 20"), and generate audio objects 34. Auditory analysis unit 24 may analyze audio data to detect and identify audio objects. Audio objects may refer to sounds that are distinct or recognizable, which may be classified or otherwise associated with a given object. For example, a car engine may emit a sound that is readily recognizable. Auditory scene analysis may attempt to detect and identify or classify, in audio data, these sounds.

Similar to visual analysis unit 22, auditory analysis unit 24 may, in some instances, communicate with an audio network server or other database external to, and possibly remote from, video capture device 10 when performing auditory scene analysis (which is also not shown in the example of FIG. 1). Auditory analysis unit 24 may communicate with this audio server to offload various aspects of the often resource (meaning, processing resources and/or memory resource) intensive auditory scene analysis process. For example, auditory analysis unit 24 may perform some initial analysis to detect objects, passing these objects to the audio server for identification. The audio server may then classify or otherwise identify the object, passing the classified object back to auditory analysis unit 24. Auditory analysis unit 24 may communicate with this audio server using the interfaces mentioned above when describing visual analysis unit 22. Auditory analysis unit 24 may output audio objects 34 as a result of performing the auditory scene analysis.

Object association unit 26 represents hardware or a combination of hardware and software that attempts to associate video objects 32 with audio objects 34. Video objects 32 and audio objects 34 may each be defined in accordance with a compatible or common format, meaning that video objects 32 and audio objects 34 are both defined in a manner that facilitates associations between objects 32 and objects 34. Each of objects 32 and 34 may include metadata defining one or more of a predicted location (e.g., an x, y, z coordinate) of the corresponding object, a size (or predicted size) of the corresponding object, a shape (or predicted shape) of the corresponding object, a speed (or a predicted speed) of the corresponding object, a location confidence level, and whether the object is in focus, or whether the object belongs to the near foreground, far foreground or the near background or the far background, to provide a few examples. Object association unit 26 may associate one or more video objects 32 with one or more audio objects 34 (often associating a single one of video objects 32 with a single one of audio objects 34) based on the metadata.

Object association unit 26 may classify objects 32 and 34 into one of three classes. The first class includes those of audio objects 34 having metadata that are associated with one of video objects 32 having metadata. The second class includes those of audio objects 34 that are not associated with any one of video objects 32. The third class includes those of video objects 32 that are not associated with any one of audio objects 34. Object association unit 26 may pass audio objects 34 classified to the first class (shown as audio objects 34') to assisted audio rendering unit 28A. Object association unit 26 may pass audio objects 34 classified to the second class (shown as audio objects 34") to unassisted audio rendering unit 28B. Object association unit 26 may pass video objects 32 classified to the third class (shown as video objects 32') to augmented reality audio rendering unit 28C.

While described with respect to three classes, the techniques may be implemented with respect to only the first two classes. The third class, in other words, may be adaptively performed based on available resources. In some instances, the third class is not utilized, especially in power limited or resource limited devices. In some instances, these power limited or resource limited devices may not include augmented reality audio rendering unit 28C, as the third class is not utilized. Moreover, object association unit 26 may not pass or otherwise classify video objects to the third class. Accordingly, the techniques should not be limited to the examples described in this disclosure but may be performed with respect to the first and second classes and not the third class.

In any event, rendering units 28 each represent hardware or a combination of hardware and software configured to render audio data 38A-38C from one or more of audio objects 34', 34" and video object 32', respectively. Assisted audio rendering unit 28A may be referred to as an "assisted" audio rendering unit 28A in that assisted audio rendering unit 28A receives audio objects 34' having metadata potentially augmented by a matching or associated one of video objects 32. In this sense, rendering unit 28A may receive assistance in more accurately rendering audio objects 34' from the corresponding or associated one of video objects 32. Assisted audio rendering unit 28A may be referred to as a foreground rendering unit 28A given that unit 28A receives audio objects that are associated with video objects, which indicates that these audio objects are associated with video objects captured by the camera and, therefore, exist in the foreground.

Unassisted audio rendering unit 28B may be referred to as "unassisted" in that rendering unit 28B renders audio objects 34" that are classified to the second class, meaning these audio objects 34" are not associated with any one of video objects 32. Accordingly, rendering unit 28B does not receive any assistance in rendering audio objects 34" from any one of video objects 32. Unassisted audio rendering unit 28B may also be referred to as a background rendering unit 28B in that the audio objects unit 28B processes are not associated with any video objects, meaning that these objects likely reside in the background or behind the user capturing the scene as video data 18.

Augmented reality audio rendering unit 28C may "augment reality" in the sense that rendering unit 28C may access an audio library (located either internal to or externally from device 10) or other audio repository to retrieve an audio object corresponding to the unmatched or unassociated video objects 32' and render audio data 38C to augment audio data 38A and 38B which reflects audio data 20 captured by microphones 16. Augmented reality audio rendering unit 28C may render audio data in the foreground given that unit 28C processes video objects 32' that are detected in the scene captured by camera 14 as video data 18.

Each of rendering units 28 may render audio data 38A-38C in a spatialized manner. In other words, rendering units 28 may produce spatialized audio data 38A-38C, where each of audio objects 34', 34" and 34''' (where audio objects 34''' refer to augmented reality audio objects 34''' retrieved by augmented reality audio rendering unit 28C) are allocated and rendered assuming a certain speaker configuration for playback. Rendering unit 28 may render audio objects 34', 34" and 34''' using head-related transfer functions (HRTF) and other rendering algorithms commonly used when rendering spatialized audio data.

Audio mixing unit 30 represents hardware or a combination of hardware and software that mixes audio data 38A-38C ("audio data 38") to a particular multi-channel audio data format. Reference to multi-channel audio data in this disclosure may refer to stereo or higher order multi-channel audio data. Higher order multi-channel audio data may include 5.1 surround sound audio data or 7.1 surround sound audio data, where the first number before the period refers to the number of channels and the number after the period refers to the number of bass or low frequency channels. For example, 5.1 surround sound audio data includes a left channel, a center channel, a right channel, a left-back or surround left channel, and a right-back or surround right channel, with a single low frequency channel. Mixing unit 30 may mix audio data 38 to one or more of these multi-channel audio data formats to generate multi-channel audio data 40.

In operation, video capture device 10 may be configured to invoke camera 14 to capture video data 18, while also concurrently configured to invoke one or more, and often all, of microphones 16 to capture audio data 20A-20E ("audio data 20"). In response to receiving video data 18 and audio data 20, control unit 12 of video capture device 10 may be configured to perform the techniques described in this disclosure for generating multi-channel audio data 40.

Upon receiving audio data 20, control unit 12 may invoke auditory analysis unit 24, which may analyze audio data 20 to identify one or more of audio objects 34. As described briefly above, auditory analysis unit 24 may perform auditory scene analysis to identify and generate audio objects 34. Likewise, upon receiving video data 18, control unit 12 may be configured to invoke visual analysis unit 22, which may analyze video data 18 concurrent to the analysis and/or capture of audio data 20 to identify one or more video objects 32. Also, as described briefly above, visual analysis unit 22 may perform visual scene analysis (using computer vision algorithms) to identify and generate one or more of video objects 32.

Visual analysis unit 22 and audio analysis unit 24 may be configured to generate video objects 32 and audio objects 34, respectively, using a common or shared format. Often, this shared format includes a textual component, which may be referred to as metadata. This metadata may describe various properties or aspects of the corresponding one of video objects 32 and audio objects 34. Video metadata describing a corresponding one of video objects 32 may specify, as a few non-limiting examples, one or more of a location, a shape, a speed, and a location confidence level of the corresponding video object. Audio metadata describing a corresponding one of audio objects 32 may likewise specify, to provide a few non-limiting examples, one or more of an audio object location, an audio object shape, an audio object speed, and a location confidence level of the corresponding audio object.

Since both the audio metadata and the video metadata are abstracted to this same semantic level, i.e., a same textual semantic level in this example, the respective tags specified by this metadata (which may refer to each of the different types of metadata described above), video capture device 10 may directly compare and map (or, in other words, associate objects) in the text domain. With mapped objects, video capture device 10 may directly associate how the device "sees" objects with how the device "hears" objects in the scene.

Control unit 12 may receive video objects 32 and audio objects 34 and invoke object association unit 26. Object association unit 26 may associate at least one of audio objects 34 with at least one of video objects 32. Object association unit 26 may, when performing this association, classify each of audio objects 34 as a type of audio object, typically based on the metadata (which in some instances may define the type of audio object). Likewise, object association unit 26 may, when performing this association, classify each of video objects 32 as a type of video object, typically based on the corresponding metadata (which in some instances may also define the type of video object). Example types of video objects may comprise a car, a beach, waves, running water, music, person, dog, cat, etc. Object association unit 26 may then determine that the type of the one of audio objects 34 is the same type as the one of video objects 32. In response to the determination that the type of the one of audio object 34 is the same as the type of the one of video object 32, object association unit 26 may associate the one of audio objects 34 with the one of video objects 32.

Object association unit 26 may generate a variety of audio objects based on a classification of audio objects 34 to one of the three different classes described above. Again, the first class includes those of audio objects 34 having metadata that are associated with one of video objects 32 having metadata. The second class includes those of audio objects 34 that are not associated with any one of video objects 34. The third class includes those of video objects 32 that are not associated with any one of audio objects 34.

Object association unit 26 may pass audio objects 34 classified to the first class (shown as audio objects 34') to assisted audio rendering unit 28A. Object association unit 26 may pass audio objects 34 classified to the second class (shown as audio objects 34") to unassisted audio rendering unit 28B. Object association unit 26 may pass video objects 32 classified to the third class (shown as video objects 32') to augmented reality audio rendering unit 28C.

With respect to those of audio objects 34 determined to belong to the first class, object association unit 26 may determine a level of correlation between the audio metadata of the one of audio objects 34 and the video metadata of the associated one video objects 32, generating combined metadata for the one of audio objects 34 to which the one video objects 32 is associated based on the determined level of correlation. In some example, object association unit 26 may replace audio metadata or a portion thereof, like the location specified by the audio metadata, with the corresponding video metadata or portion thereof. Object association unit 26 may then pass this audio object 34 to assisted audio rendering unit 28A as one of audio objects 34'. Assisted audio rendering unit 28A may then render the one of audio objects 34' in one or more foreground channels of multi-channel audio data 40 based on the combined metadata generated for the one of audio objects 34'. Assisted audio rendering unit 28A passes this portion of the multi-channel audio data 40 to audio mixing unit 30 as audio data 38A.

With respect to those of audio objects 34 determined to belong to the second class, object rendering unit 26 may determine that one of audio objects 34 is not associated with any one of the video objects 32. Object rendering unit 26 may pass these audio objects 34 to unassisted audio rendering unit 28B as one of audio objects 34". Unassisted audio rendering unit 28B may generate multi-channel audio data 40 so that the one of audio objects 34" originates in one or more background channels of multi-channel audio data 40. That is, because these audio objects 34 are not associated with any one of video objects 32, unassisted audio rendering unit 28B is configured to assume that these audio objects 34" are objects that occur outside of the scene captured by camera 14. As such, unassisted audio rendering unit 28B may be configured to render audio objects 34" in the background often as diffuse sounds. Unassisted audio rendering unit 28B passes this portion of the multi-channel audio data 40 to audio mixing unit 30 as audio data 38B.

With respect to those video objects 32 determined to belong to the third class, i.e., where video objects 32 are not associated with any one of audio objects 34 in the example of FIG. 1B, object association unit 26 may pass these video objects 32 to augmented reality audio rendering unit 28C as video objects 32'. Augmented reality audio rendering unit 28C may, in response to receiving video objects 32', retrieve a reference audio object from an audio library that would have been associated with the each one (if possible) of video objects 32'. Augmented reality audio rendering unit 28C may then render each of the reference audio objects (which may be referred as audio objects 34") to generate at least a portion of multi-channel audio data 40. Augmented reality audio rendering unit 28C passes this portion of the multi-channel audio data 40 to audio mixing unit 30 as audio data 38C.

Audio mixing unit 30 receives audio data 38 and mixes this audio data 38 to form multi-channel audio data 40. Audio mixing unit 30 may mix this audio data 38 in the manner described above to generate any form of multi-channel audio data 40. These formats may include a 5.1 surround sound format, a 7.1 surround sound format, a 10.1 surround sound format, a 22.2 surround sound format, or any other proprietary or non-proprietary format.

In this way, control unit 12 of video capture device 10 may be configured to analyze audio data to identify one or more audio objects and analyze video data captured with the device concurrent to the capture of the audio data to identify one or more video objects. Control unit 12 may further be configured to associate one of audio objects 34 with one of video objects 32 and generate multi-channel audio data 40 from audio data 20 based on the association of the one of audio objects 34 with the one of video objects 32.

Given that video scene analysis may more closely identify the location of the video objects relative to video capture device 10 in comparison to the audio objects alone, video capture device 10 may better localize the audio objects in comparison to relying solely on often inaccurate beam-forming techniques. These audio objects may then be rendered to one or more channels using decibel differences that better localize the audio objects to one of the front channels, thereby enabling better generation of surround sound or multi-channel audio data in comparison to that generated by conventional video capture devices.

Moreover, video capture device may render audio objects 32 as discrete audio sources in the foreground (180 degrees in front of a listener) in some examples. For audio objects 32 that video capture device 10 "hears" but does not "see," video capture device 10 may render these audio objects 32 in the background because these audio objects 32 are more likely to be behind the listener.

While described above as being performed by video capture device 10, the techniques may be implemented by a device different than the device that captured video data 18 and audio data 20. In other words, a smart phone or other video capture device may capture video data and audio data, uploading this video data and audio data to a different device, such as a dedicated processing server, a desktop computer, a laptop computer, a tablet or slate computer, or any other type of device capable of processing data. This other device may then perform the techniques described in this disclosure to facilitate the generation of what may be considered more accurate surround sound or multi-channel audio data. Accordingly, while described as being performed by the device that captured the video and audio data, the techniques may be performed by a device different from the device that captured the video and audio data and should not be limited in this respect to the examples described in this disclosure.

FIGS. 2A-2D are diagrams illustrating operations performed by video capture device 10 of FIG. 1 in associating video objects 32 with audio objects 34 in accordance with the techniques described in this disclosure. In the above FIG. 2A, one of audio objects 34 (denoted "audio object 34A" in the example of FIG. 2A) and one of video object 32 (denoted "video object 32A" in the example of FIG. 2A) include respective audio metadata 54A and video metadata 52A. Object association unit 26 of video-capture device 10 may associate audio object 34A with video object 32A, using video metadata 52A to augment audio metadata 54A to generate an augmented audio object 34A' (which is one of audio objects 34 shown in the example of FIG. 1B) having augmented metadata 56A. This augmented metadata 56A may include both audio metadata 54A and video metadata 52A, where in some instances video metadata 52A may replace some or all of audio metadata 54A. In some instances, object association unit 26 may determine that audio metadata 54A and video metadata 52A have a high correlation.

In other instances, object association unit 26 may determine that audio metadata 54A and video metadata 52A have a low correlation. In this instance, object association unit 26 may weight video metadata 52A to favor video metadata 52A over audio metadata 52A, when generating augmented metadata 56A. When rendering and mixing this audio object 34A' to generate multi-channel audio data 40, assisted audio rendering unit 28A may render this audio object 34A' as more diffuse, spreading audio object 34A' across more channels in the foreground due to the lack of correlation between audio metadata 54A and video metadata 52A. Video capture device 10 may perform various diffusion algorithms, such as sound decorrelation, to these objects to diffuse the objects.

In the example of FIG. 2B, auditory analysis unit 24 identifies another one of audio objects 34 (denoted audio object 34B in the example of FIG. 2B) but is unable to identify any metadata for audio object 34B. This example reflects an instance where multiple microphones are not available on video capture device 10 and, as a result, video-capture device 10 cannot determine audio metadata. As a result, object association unit 26 may utilize video metadata 52B of an associated video object 32B in place of audio metadata when rendering this audio object to generate audio object 34B' (which refers to one of audio objects 34'). As shown in the example of FIG. 2B, audio object 34B' includes video metadata 52B.

In the example of FIG. 2C, auditory analysis unit 24 identifies one of audio objects 34 (denoted as "audio object 34C") and determines audio metadata 54C for this audio object, but is unable to identify any of video objects 32 to which this audio object 34C corresponds. Because no video object has been identified for this audio object 34C, object association unit 26 may determine that audio object 34C is located behind video-capture device 10. Object association unit 26 may, based on this determination, pass audio object 34C to unassisted rendering unit 28B as one of audio object 34" (i.e., audio object 34C" in the example of FIG. 2C), which may then render this audio object in the background channels of multi-channel audio data 40. When rendering this audio object 34C", unassisted audio rendering unit 28B may render audio object 34C" based on the predicted location in audio metadata 54C or very diffusely across the background channels. That is, video capture device 10 may estimate the actual location based on the audio metadata, or render the object very diffusely (using the above identified sound diffusion processes), so it has a cloud-like shape in space without specific perceptual angle.

In the example of FIG. 2D, object association unit 26 receives one of video objects 32 (denoted as "video object 32D" in the example of FIG. 2D) that includes video metadata 52D, but is unable to associate video object 32D with any one of audio objects 34. As a result, object association unit 26 passes video object 32D to augmented reality audio rendering unit 28C as one of video objects 32' (i.e., video object 32D' in the example of FIG. 2D). Video object 32D includes video metadata 52D. Augmented reality audio rendering unit 28C may utilize video metadata 52D to access the library of reference audio objects 34'', retrieving one of reference audio objects 34''' that would have been associated with video object 32D' (e.g., such as a reference audio object 34''' that matches the type specified in video metadata 52D identifying the type of object 32D'). Augmented reality audio rendering unit 28C may then render this reference audio object 34''' using video metadata 52D to refine or otherwise spatialize the rendering of audio object 34'''.

In this way, video-capture device 10 may render the audio objects based on a correlation of the metadata specified by the audio object with the metadata specified by the associated video object, attempting to localize the audio object as originating from some video object or portion thereof. Considering that video scene analysis is often much more accurate than auditory scene analysis, video-capture device 10 may, in some examples (such as FIG. 2A) favor (using weights) the video object metadata over the audio object metadata. The video-capture device may, in some instances, generate audio objects that have no or very uncertain metadata (such as shown in the example of FIG. 2B), where the video-capture device may import "matching" video object metadata for use as the metadata to use when rendering the audio object.

To illustrate, augmented metadata 56A may include both audio metadata 54A and video metadata 52A, where in some instances video metadata 52A may replace audio metadata 54A. In some instances, video-capture device 10 may determine that audio metadata 54A and video metadata 52A have a high correlation. In other words, video-capture device 10 may determine that a location of the object that emitted the sound specified in audio metadata 54A correlates to a high degree (e.g., which may be defined by some confidence threshold, often expressed as a percentage) with a location of the corresponding object defined by video metadata 52A. Video-capture device 10 may then render and mix the audio object to generate multi-channel audio data 40 with high confidence.

In other instances, video-capture device 10 may determine that audio metadata 54A and video metadata 52A have a low correlation. In this instance, video-capture device 10 may weight video metadata 52A to favor video metadata 52A over audio metadata 54A, when generating augmented metadata 56A. When rendering and mixing audio object 34A' to generate multi-channel audio data 40, video-capture device 10 may render audio object 34A' as more diffuse, spreading audio object 34A' across more channels in the foreground due to the lack of correlation between audio metadata 54A and metadata 52A.

Figure 3:
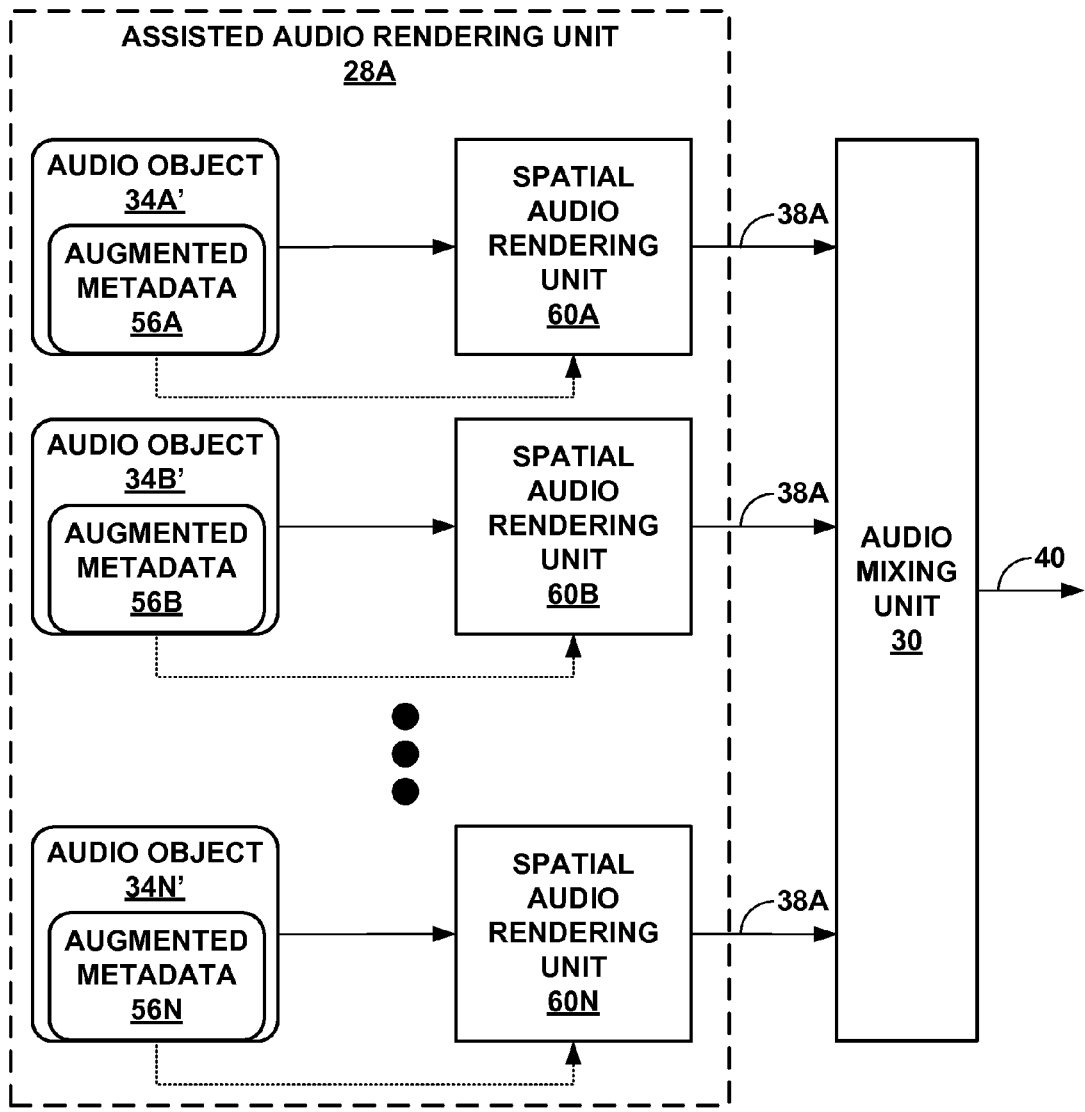
FIG. 3 is a block diagram illustrating assisted audio rendering unit of FIG. 1B in more detail.

FIG. 3 is a block diagram illustrating assisted audio rendering unit 28A of FIG. 1B in more detail. In the example of FIG. 3, assisted audio rendering unit 28A includes a number of spatial audio rendering units 60A-60N ("spatial audio rendering units 60"). While a number of spatial audio rendering units 60 are shown in the example of FIG. 3, assisted audio rendering unit 28 may, in some instances, only include a single spatial audio rendering unit 60 that is capable of processing multiple objects in parallel. Alternatively, assisted audio rendering unit 28 may include a single spatial audio rendering unit 60 that is capable of processing only a single audio object. The techniques should therefore not be limited in this respect to the example of FIG. 3.

In the example of FIG. 3, each of spatial audio rendering units 60 may represent a separate audio rendering process that performs spatial audio rendering with respect to audio objects 34A'-34N' ("audio objects 34'", which are shown in the example FIG. 1B) to generate audio objects 38A. Spatial audio rendering may refer to various algorithms or processes for rendering audio data and may include, as a few examples, ambisonics, wave field synthesis (WFS) and vector-based amplitude panning (VBAP). Spatial audio rendering units 60 may process respective ones of audio objects 34' based on augmented metadata 56A-56N ("augmented metadata 56"). That is, spatial audio rendering units 60 may render audio objects 34' using augmented metadata 56 to further refine or otherwise more accurately locate the corresponding one of audio objects 34' so that this one of audio objects 34' can be more accurately reproduced when multi-channel audio data 40 is played. Spatial audio rendering units 60 may output rendered audio data 38A to audio mixing unit 30, which may then mix rendered audio data 38A to produce multi-channel audio data 40. In some instances, audio data 38A corresponding to a given audio object 34' may be mixed across two or more channels of multi-channel audio data 40.

While described with respect to assisted audio rendering unit 28A in the example of FIG. 3, each of rendering units 28 may include spatial audio rendering units similar to spatial audio rendering units 60, which may likewise process audio objects 34'' and 34''' (which, again, refers to reference audio objects 34''' retrieved from a reference audio library and which would have been associated with video objects 32') to generate audio data 38B and 38C. Moreover, while described as including rendering unit 28C, video capture device 10 may not include rendering unit 28C, where video capture device 10 may not perform the augmented reality audio rendering aspects of the techniques described in this disclosure.

Figure 4:
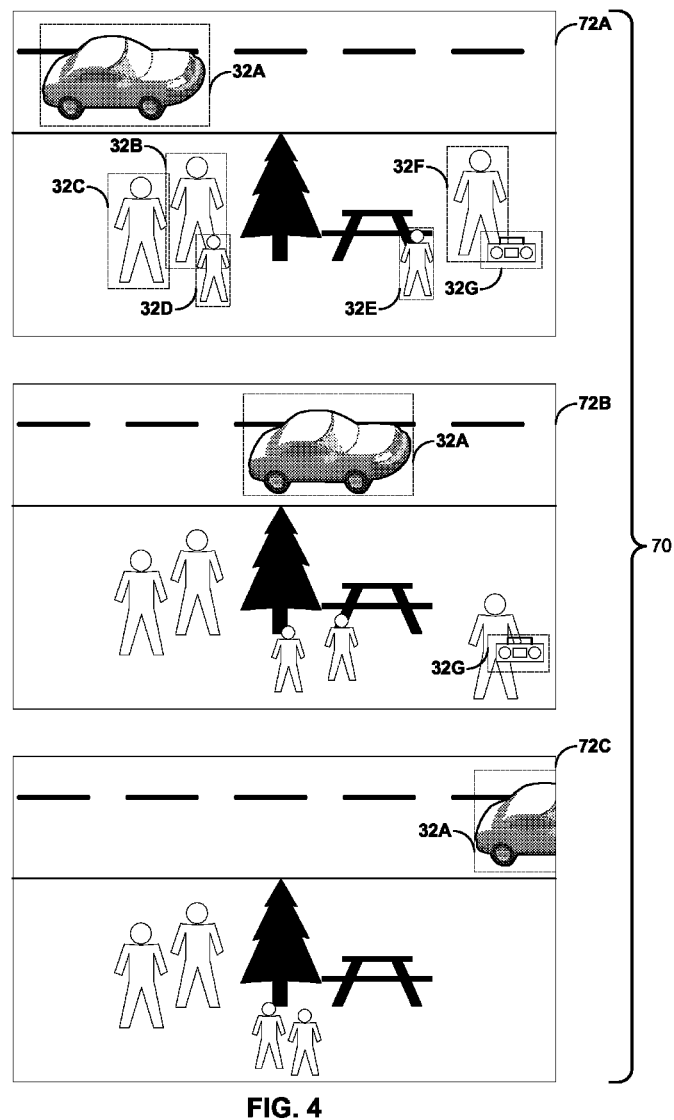
FIG. 4 is a diagram illustrating a scene captured by a camera of the video capture device shown in the example of FIG. 1B and processed in accordance with the techniques described in this disclosure.

FIG. 4 is a diagram illustrating scene 70 captured by camera 14 of video capture device 10 shown in the example of FIG. 1B and processed in accordance with the techniques described in this disclosure. Scene 70 may represent a portion of video data 18 shown in the example of FIG. 1B. Video capture device 10 may, in response to receiving scene 70, invoke visual analysis unit 22, which processes scene 70 to identify video objects 32.

As shown in FIG. 4, scene 70 includes a first frame or image 72A, a second frame or image 72B and a third frame or image 72C, e.g., in a temporal sequence of frames. While shown as including only three frames or images 72A-72C ("images 72") for ease of illustration purposes, scene 70 may include a large number of images 72 or a single image 72 and the techniques should not be limited in this respect to the example shown in FIG. 4.

In any event, visual analysis unit 22 may process images 72A using computer-vision algorithms to identify video objects 32A-32G. Visual analysis unit 22 may generate video objects 32A-32G to include or otherwise be associated with video metadata 52A-52G. Video metadata 52A-52G may define a corresponding location of video objects 32A-32G relative to camera 14 that captured scene 70. Video metadata 52A-52G may also generally identify the type of the corresponding one of video objects 32, e.g., based on machine-vision based object recognition, which may be supported entirely within visual analysis unit 22 or by visual analysis unit 22 in conjunction with one or more external, and possibly, remote network servers. For example, video metadata 52A associated with video object 32A may identify video object 32A as a car. Video metadata 52B-32F, as another example, may identify the type of corresponding ones of video objects 32B-32F as a person. Video metadata 52G, as yet another example, may identify the type of corresponding video object 32G as a stereo.

Visual analysis unit 22 may analyze one or more of images 72 concurrently to generate location information in the form of visual metadata 52A-52G to express movement, speed, or other location related metrics that describe how video objects 32A-32G move during scene 70. To illustrate, consider video object 32A from image 72A to image 72C, where video object 32A has moved from a first location to a second location and then to a third location along a nearly horizontal line. Visual analysis unit 22 may identify object 32A, generating video metadata 52A to indicate that, from image 72A to image 72B and then to image 72C, video object 32A has moved from the first location to the second location and then to the third location. This video metadata 52A may, when associated with a corresponding one of audio objects 34 (e.g., audio object 34A), enable object association unit 26 to augment audio metadata 54A to specify the location of the object that emits audio data identified as audio object 34A more accurately (given that visual scene analysis is commonly more accurate than auditory scene analysis). Object association unit 26 may then generate audio object 34' having augmented metadata 56A (as shown, for example, in FIG. 2A).

As another example, consider video object 32G as it moves within scene 70. Initially, image 72A shows video object 32G in a first location. Image 72B shows video object 32G in a second location. Image 72C does not include video object 32G, suggesting that video object 32G has left the scene and is either in the background or off to the left or right side of scene 70 being captured by camera 14. Object association unit 26 may then generate video object 32G to include video metadata 52G specifying the location of video object 32G as it moves throughout scene 70. Object association unit 26 may associate video object 32G with one of audio objects 34, having metadata specifying the same type, i.e., stereo, in this example. However, given that video object 32G leaves the scene, object association unit 26 may not replace or otherwise utilize location information specified by video metadata 52G, but instead maintain location information specified by audio metadata 54 associated with this one of audio objects 34.

Object association unit 26 may utilize the location specified by video metadata 52G when rendering the associated one of audio objects 34, e.g., audio object 34G, for playback with respect to images 72A, 72B. However, video metadata 52G may specify a high confidence level for the location at these times, but specify a low to zero confidence for location information at times corresponding to image 72C. As a result, object association unit 26 may not replace or otherwise utilize the location information specified by video metadata 52G when rendering associated audio object 34G for playback at times during which image 72C is presented. Instead, object association unit 26 may utilize location information specified by audio object 34G when rendering audio object 34G during times that image 72C is to be presented.

As noted above, object association unit 26 may be unable to identify video object 32G that corresponds to audio object 34G, such as in the example of image 72C. That is, video object 32G may leave scene 70, as shown in image 72C, but the music playing from the stereo may still be captured and identified as audio object 34G. In this instance, object association unit 26 may perform the operations described above with respect to FIG. 2C. That is, object association unit 26 may re-classify audio object 34G from a current classification of an audio object associated with a video object to an audio object 34G that is not associated with any one of video objects 32, processing audio object 34G in the manner described above with respect to FIG. 2C. Object association unit 26 may generate audio object 34G", passing this audio object 34G" to unassisted audio rendering unit 28B. In this respect, audio object 34G may transition from being processed in the manner described above with respect to FIG. 2A to being processed in the manner described above with respect to FIG. 2C.

In this manner, video capture device 10 may dynamically perform the techniques described in this disclosure to potentially generate more accurate multi-channel audio data 40. To this end, video capture device 10 may adaptively classify audio objects 34, transitioning these audio objects 34 and video objects 32 between various ones of the three classes described above. In some instances, video capture device 10 may adaptively classify audio objects 34 and video objects 32, transitioning from processing audio objects 34 and video objects 32 from one of the ways described above with respect to FIGS. 2A-2D to a different one of the ways described above with respect to FIGS. 2A-2D.

Figure 5:
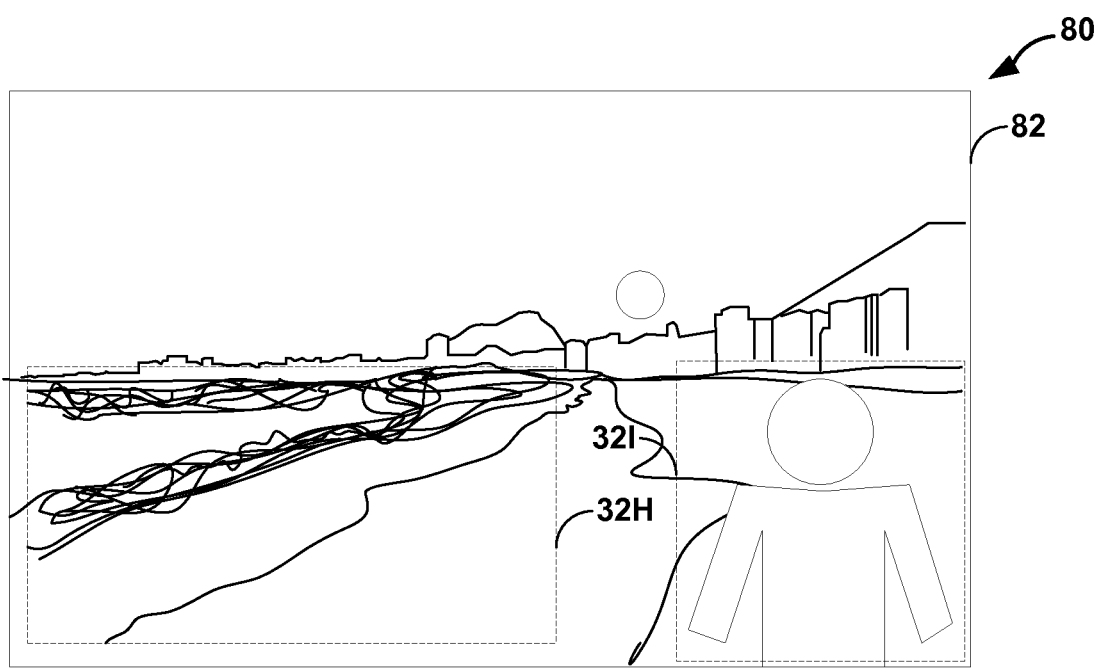
FIG. 5 is a diagram illustrating another scene captured by the camera of the video capture device shown in the example of FIG. 1B and processed in accordance with augmented reality aspects of the techniques described in this disclosure.

FIG. 5 is a diagram illustrating another scene 80 captured by camera 14 of video capture device 10 shown in the example of FIG. 1B and processed in accordance with the augmented reality aspects of the techniques described in this disclosure. In the example of FIG. 5, scene 80 may represent a portion of video data 18 shown in the example of FIG. 1B. Video capture device 10 may, in response to receiving scene 80, invoke visual analysis unit 22, which processes scene 80 to identify video objects 32I and 32H. Scene 80 includes an image 82. While shown as including only a single image, image 82, for ease of illustration purposes, scene 80 may include additional images and the techniques should not be limited in this respect to the example shown in FIG. 5.

In any event, visual analysis unit 22 may identify and generate video objects 32I and 32H to include video metadata 52I and 52H, respectively. Visual analysis unit 22 may pass visual objects 32I and 32H to object association unit 26, which may attempt to associate visual objects 32I and 32H to one of audio objects 34. Object association unit 26 is assumed for purposes of example to associate visual object 32I to one of audio objects 34, e.g., audio object 34I. Object association unit 26 may then process audio object 34I in view of associated video object 32I in a manner similar to that described above with respect to the example of FIG. 2A. Object association unit 26 may then generate audio object 34I' having augmented metadata 56I.

In addition to the person identified as video object 32I, scene 80 includes a beach that visual analysis unit 22 has identified as video object 32H, where it is assumed for purposes of illustration that the sound of the waves is not captured by microphones 16. That is, it is assumed that video capture device 10 is sufficiently distant from the beach such that the sound of the waves crashing into the sand is not audible either due to the distance, the person talking, wind noise, or some other interference. Object association unit 26 may, as a result, classify video object 32H as belonging to the third class, i.e., those of video objects 32 that are not associated with any one of audio objects 34 in the examples of this disclosure. As a result, object association unit 26 may process video object 32H in the manner described above with respect to the example of FIG. 2D, generating video object 32H'. Object association unit 26 may then forward video object 32H' to augmented reality audio rendering unit 28C.

Audio rendering unit 28C may receive video object 32H' and retrieve a corresponding one of reference audio objects 34''' that is of the same type, which in this instance may be a type of waves, beach, etc. Audio rendering unit 28C may then render this one of reference audio objects 34'', e.g., audio rendering object 34H''' based on video metadata 52H. Augmented reality audio rendering unit 28C may pass this rendered audio data as audio data 38C to mixing unit 30, which mixes audio data 38A-38C to form multi-channel audio data 40 in the manner described above.

Figure 6:
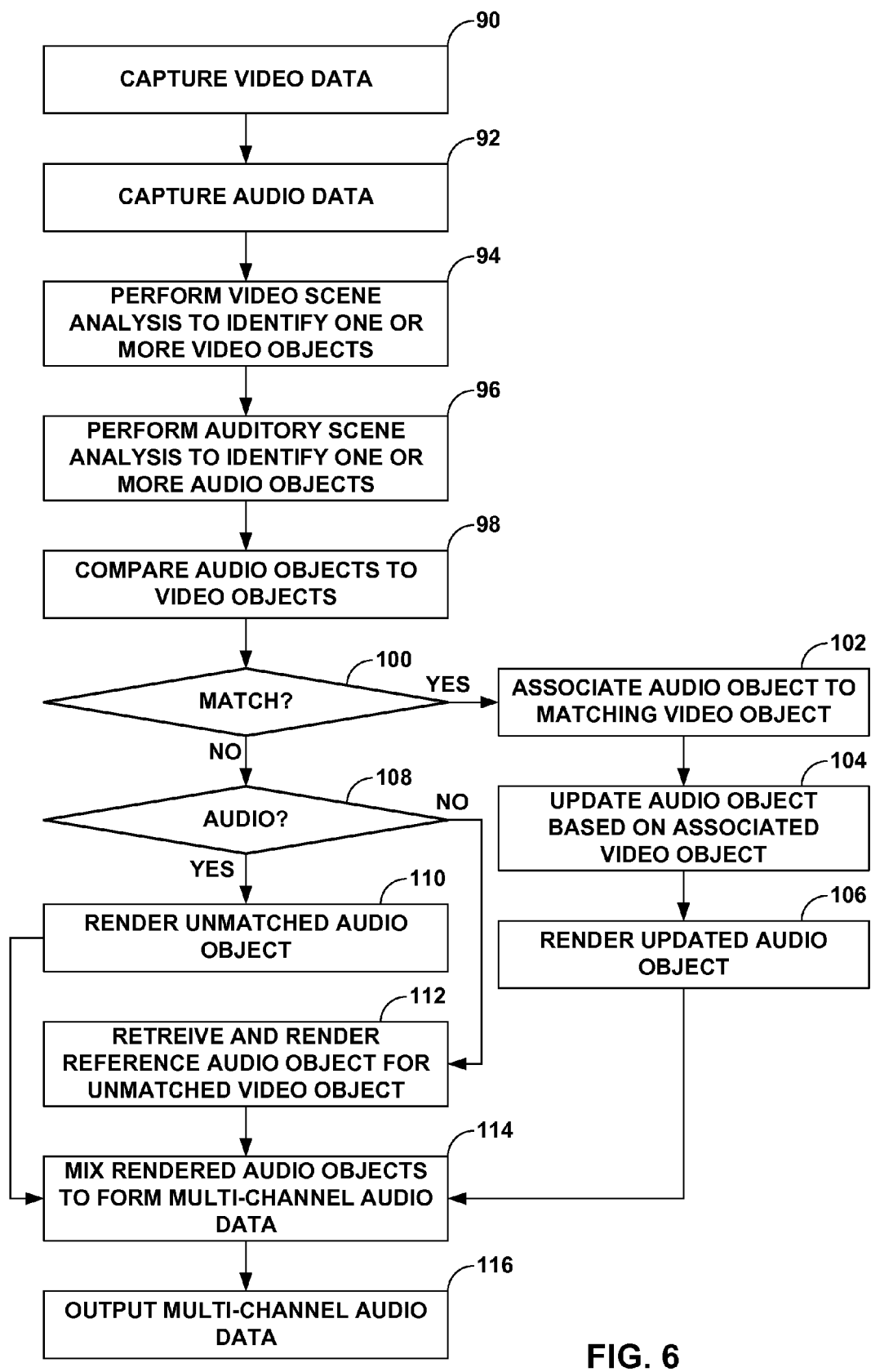
FIG. 6 is a flowchart illustrating exemplary operation of a video capture device in performing the techniques described in this disclosure.

FIG. 6 is a flowchart illustrating exemplary operation of a video capture device, such as video capture device 10 shown in the example of FIG. 1B, in performing the techniques described in this disclosure. Initially, video capture device 10 may be configured to invoke camera 14 to capture video data 18, while also concurrently configured to invoke one or more, and often all, of microphones 16 to capture audio data 20 (90, 92). In response to receiving video data 18 and audio data 20, control unit 12 of video capture device 10 may be configured to perform the techniques described in this disclosure for generating multi-channel audio data 40.

Upon receiving video data 18, control unit 12 may be configured to invoke visual analysis unit 22, which may perform visual scene analysis with respect to video data 18 to identify one or more video objects 32 (94). Upon receiving audio data 20, control unit 12 may invoke auditory analysis unit 24, which may perform auditory scene analysis with respect to audio data 20 to identify one or more of audio objects 34 (96).

Control unit 12 may receive video objects 32 and audio objects 34 and invoke object association unit 26. Object association unit 26 may compare audio objects 34 to video objects 32 in an attempt to associate at least one of audio objects 34 with at least one of video objects 32 (98). As described above, object association unit 26 may, when performing this association, classify each of audio objects 34 as a type of audio object, typically based on the metadata (which in some instances may define the type of audio object). Likewise, object association unit 26 may, when performing this association, classify each of video objects 32 as a type of video object, typically based on the corresponding metadata (which in some instances may also define the type of video object). Example types may comprise a car, a beach, waves, running water, music, person, dog, cat, wind, etc. Object association unit 26 may then determine that the type of the one of audio objects 34 is the same type as the one of video objects 32 and thereby determine a match (100). In response to the determination that the type of the one of audio object 34 is the same as the type of the one of video object 32 or, in other words, that a match has been identified ("YES" 100), object association unit 26 may associate the one of audio objects 34 with the matching one of video objects 32 (102).

With respect to those of audio objects 34 determined to belong to the first class, object association unit 26 may determine a level of correlation between the audio metadata of the one of audio objects 34 and the video metadata of the associated one of video objects 32, generating combined metadata for the one of audio objects 34 to which the one video objects 32 is associated based on the determined level of correlation. In some example, object association unit 26 may replace audio metadata or a portion thereof, like the location specified by the audio metadata, with the corresponding video metadata or portion thereof. In this manner, object association unit 26 may update one or more of audio object 34 based on the associated one of video objects 32 to generate updated or augmented audio objects 34' (104).

Object association unit 26 may then pass these audio objects 34' to assisted audio rendering unit 28A. Assisted audio rendering unit 28A may then render the one of audio objects 34' in one or more foreground channels of multi-channel audio data 40 based on the combined metadata generated for the one of audio objects 34' (106). Assisted audio rendering unit 28A passes this portion of the multi-channel audio data 40 to audio mixing unit 30 as audio data 38A.

With respect to those of audio objects 34 determined to belong to the second class, i.e., those of audio objects 34 determined not to correspond to any one of video objects 32 in the examples of this disclosure (or, in other words, audio object for which there is no match, "NO" 100, "YES" 108), object association unit 26 may pass these audio objects 34 to unassisted audio rendering unit 28B as one of audio objects 34". Unassisted audio rendering unit 28B may generate multi-channel audio data 40 so that the one of audio objects 34" originates in one or more background channels of multi-channel audio data 40. Unassisted audio rendering unit 28B may be configured to render unmatched audio objects 34" in the background often as diffuse sounds (110). Unassisted audio rendering unit 28B passes this portion of the multi-channel audio data 40 to audio mixing unit 30 as audio data 38B.

With respect to those video objects 32 determined to belong to the third class, i.e., where video objects 32 are not associated with any one of audio objects 34 in the example of FIG. 1B (or, in other words, those of video objects 32 who do not match any of audio objects 34 and that are video objects, "NO" 100, "NO" 108), object association unit 26 may pass these video objects 32 to augmented reality audio rendering unit 28C as video objects 32'. Augmented reality audio rendering unit 28C may, in response to receiving video objects 32', retrieve a reference audio object from an audio library that would have been associated with the each one (if possible) of video objects 32' and then renders each of the reference audio objects (which may be referred to as audio objects 34") to generate at least a portion of multi-channel audio data 40 (112). Augmented reality audio rendering unit 28C passes this portion of the multi-channel audio data 40 to audio mixing unit 30 as audio data 38C.

Audio mixing unit 30 receives audio data 38 and mixes this audio data 38 to form multi-channel audio data 40 (114). Audio mixing unit 30 may mix this audio data 38 in the manner described above to generate any form of multi-channel audio data 40. These formats may include a 5.1 surround sound format, a 7.1 surround sound format, a 10.1 surround sound format, a 22.2 surround sound format, or any other proprietary or non-proprietary format. Audio mixing unit 30 may then output this multi-channel audio data 40 (116).

In this way, control unit 12 of video capture device 10 may be configured to analyze audio data to identify one or more audio objects and analyze video data captured with the device concurrent to the capture of the audio data to identify one or more video objects. Control unit 12 may further be configured to associate one of audio objects 34 with one of video objects 32 and generate multi-channel audio data 40 from audio data 20 based on the association of the one of audio objects 34 with the one of video objects 32.

While described in the context of generating multi-channel audio data 40, video capture device 10 may further encode the video data. When encoding the video data diffusing audio objects may enable video capture device 10 to encode these audio objects using less bits. That is, audio objects in the rear background or far distance may not need to be rendered with high quality, since they are either not seen by the eyes or less important than audio objects in the focused near-distance space, and very likely to be masked when presented together with other audio objects. As a result, video capture device 10 may allocate less bits to these audio objects when encoding and transmitting them for a playback system.

Also, while described as being performed after the capture of the audio data and video data (or "off-line" as this form of processing is commonly referred) or not in real-time or near-real-time systems, the techniques may be implemented in real-time or near-real-time systems during the capture of at least a portion of the audio data and the video data. There are implementations of video scene analysis for near-real-time or real-time systems, while audio scene analysis is typically not as complex as video scene analysis, meaning that audio scene analysis can be performed in near-real-time or real-time devices.

Furthermore, while described with respect to audio and visual domains, the techniques may be performed with respect to other domains. For example, touch, motion, compass, altitude, temperature and other sensor domains, can also be considered together to enhance the media rendering quality with a possible focus on the 3D spatial nature. Accordingly, the techniques should not be limited in this respect to the examples set forth in this disclosure.

Figure 7:
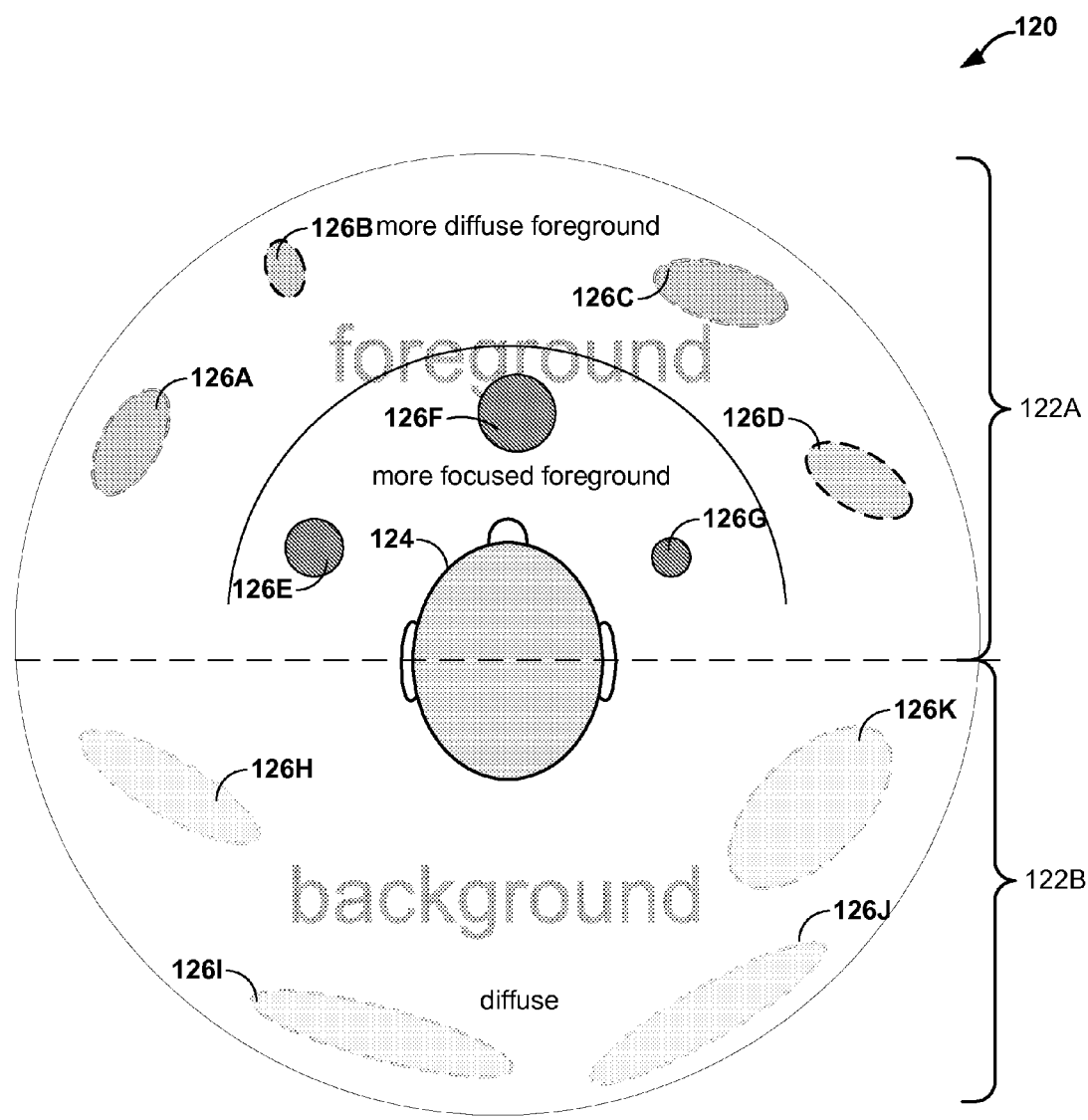
FIG. 7 is a diagram illustrating how various audio objects may be rendered in the foreground and background of multi-channel audio data in accordance with the techniques described in this disclosure.

FIG. 7 is a diagram illustrating how various audio objects 126A-126K may be rendered in the foreground and background of multi-channel audio data in accordance with the techniques described in this disclosure. The diagram of FIG. 7 specifies a view 120 that shows what is commonly referred to as the "sweet spot" from a top down perspective or bird's eye view. The sweet spot refers to the location in a room where the surround sound experience is most optimal when the loudspeakers are properly configured for 5.1 or higher order surround sound playback.

In the example of FIG. 7, view 120 is segmented into two portions, which are denoted as foreground portion 122A and background portion 122B. Within the circle, a listener 124 is located in the middle of the sweet spot, on the horizontal access separating foreground portion 122A from background portion 122B. During playback of multi-channel audio data 40, listener 124 may hear audio objects 126A-126K in the sound field as presented in view 120. That is, audio objects 126A-126D appear, from the perspective of listener 124, to be originating from the more distant foreground. Audio objects 126A-126D may have been processed in the manner described above with respect to FIG. 2B by object association unit 26 with the result that assisted audio rendering unit 28A renders these in the far foreground as more diffuse audio objects due to the lack of any audio metadata.

Audio objects 126E-126G may appear, from the perspective of listener 124, to be originating in the more near foreground, as more focused objects. Audio objects 126E-126G may have been processed in the manner described above with respect to FIG. 2A by object association unit 26 with the result that assisted audio rendering unit 28A renders these in the more focused foreground due to ability of object association unit 26 to provide augmented metadata having high audio and video metadata correlation.

One or more of audio objects 126A-126G may be reference audio objects retrieved from a reference library in the manner described above with respect to augmented reality audio rendering unit 28C. In this sense, object association unit 26 may identify those of video objects 32 that do not match any one of audio objects 34, passing these ones of video objects 32 to augmented reality audio rendering unit 28C as video objects 32'. Augmented reality audio rendering unit 28C may then retrieve one of reference audio objects 34' that corresponds or matches one of video objects 32' and render this one of reference audio objects 34' based on the video metadata included within the associated one of video objects 32'.

Audio objects 126H-126K may appear, form the perspective of listener 124, to be originating in the background. Audio objects 126H-126K may have been processed in the manner described above with respect to FIG. 2C by object association unit 26 with the result that unassisted audio rendering unit 28B renders these in the background due to inability of object association unit 26 to associate these audio objects 34" with any one of video objects 32. That is, because auditory scene analysis is typically not as precise in locating the origin of a sound in comparison to visual scene analysis, unassisted audio rendering unit 28B may be unable to accurately locate the source of audio objects 34". Unassisted audio rendering unit 28B may only render audio objects 34" based at most on corresponding audio metadata 54, which may result in audio rendering unit 28B rendering these audio objects 34" in the background as more diffuse objects.

In this manner, the techniques may enable a device to analyze audio data captured with a device to identify one or more audio objects and analyze video data captured with the device concurrent to the capture of the audio data to identify one or more video objects. The device may further associate at least one of the one or more audio objects with at least one of the one or more video objects, and generate multi-channel audio data from the audio data based on the association of the at least one of the one or more audio objects with the at least one of the one or more video objects.

In some instances, the device may, when analyzing the audio data, perform auditory scene analysis of the audio data to identify the one or more audio objects and audio metadata describing the one or more audio objects, where the audio metadata comprises one or more of a location, a shape, a speed, and a location confidence level of the corresponding audio object. The device may, when analyzing the video data perform visual scene analysis of the video data to identify the one or more video objects and video metadata describing the one or more video objects, where the video metadata comprises one or more of a location, a shape, a speed, and a location confidence level of the corresponding audio object.

The device may, in some instances, when associating the at least one of the one or more audio objects with the at least one of the one or more video objects, classify each of the one or more audio objects as a type of audio object, classify each of the one or more video objects as a type of video object, determine that the type of the at least one of the audio objects is the same type as the at least one of the video objects, and in response to the determination that the type of the at least one of the one or more audio object is the same as the type of the at least one of the one or more video object, associate the at least one of the one or more audio objects with the at least one of the one or more video objects.

In some instances, the device may, when generating the multi-channel audio data, determine a level of correlation between the audio metadata of the at least one of the one or more audio objects and the video metadata of the at least one of the one or more video objects associated with the at least one of the one or more audio objects, generate combined metadata for the at least one of the one or more audio objects to which the at least one of the one or more video objects is associated based on the determined level of correlation, and render the at least one of the one or more audio objects in one or more foreground channels of the multi-channel audio data based on the combined metadata generated for the at least one of the one or more audio objects.

In some instances, the at least one of the one or more audio objects comprises a first one of the one or more audio objects. The device may, in these instances, further determine that a second one of the one or more audio objects is not associated with any one of the one or more video objects, and when generating the multi-channel audio data, generate the multi-channel audio data so that the second one of the audio objects originates in one or more background channels of the multi-channel audio data.

The device may, when generating the multi-channel audio data, generate the multi-channel audio data so that the second one of the audio objects originates as a diffuse audio object in the one or more background channels of the multi-channel audio data.

In some instances, the at least one of the one or more video objects comprises a first one of the one or more video objects. In these instances, the device may determine that a second one of the one or more of the video objects is not associated with any one of the one or more audio objects. In response to determining that the second one of the one or more of the video objects is not associated with any one of the one or more audio objects, the device may retrieve a reference audio object from an audio library that would have been associated with the second one of the one or more video objects. Moreover, the device may render the reference audio object based on the second one of the one or more video objects to generate at least a portion of the multi-channel audio data.

In some instances, the device may, when analyzing the audio data, perform auditory scene analysis of the audio data to identify the one or more audio objects and audio metadata describing the one or more audio objects. The device may also, when analyzing the video data, perform visual scene analysis of the video data to identify the one or more video objects and video metadata describing the one or more video objects. In these instances, the audio metadata is defined in a textual format common to the textual format used to define the video metadata.

In some instances, the device may, when analyzing the audio data, perform auditory scene analysis of the audio data to identify the one or more audio objects and audio metadata describing the one or more audio objects. When analyzing the video data, the device may perform visual scene analysis of the video data to identify the one or more video objects and video metadata describing the one or more video objects. In these instances, the device may, when generating the multi-channel audio data, determine a level of correlation between the audio metadata identified for the at least one of the audio objects and the video metadata identified for the associated one of the video objects, and render the at least one of the audio object as a diffuse audio object based on the determined level of correlation when generating the multi-channel audio data. Often, this level of correlation is based on some form of confidence interval, where the level of correlation may be derived as a function of a percentage difference between the audio and counterpart video object metadata and the confidence interval.

Various aspects of the techniques may also enable a device comprising one or more processors to obtain an audio object, obtain a video object, associate the audio object and the video object, compare the audio object to the associated video object and render the audio object based on the comparison between the audio object and the associated video object.

In some instances, the audio object includes audio metadata. In some instances, the audio metadata comprises a size and a location. In some instances, the video object includes video metadata. In some instances, the video metadata comprises a size and location.

In some instances, the one or more processors, when comparing the audio object to the associated video object, are further configured to generate, at least in part, combined metadata comprising one or more of a size and a location.

In some instances, the audio object includes location metadata, and the video object includes location metadata. When generating the combined metadata, the one or more processors are further configured to compare the location metadata of the audio object to the location metadata of the video object to determine a correlation value, and generate location metadata of the combined metadata based on a determination of whether the correlation value exceeds a confidence threshold.

Moreover, various aspects of the techniques may provide for a method that includes obtaining an audio object, obtaining a video object, associating the audio object and the video object, comparing the audio object to the associated video object and rendering the audio object based on the comparison between the audio object and the associated video object.

Additionally, when comparing the audio object to the associated video object, the method may further comprise generating, at least in part, combined metadata comprising one or more of a size and a location.

Also, when the audio object includes location metadata and the video object includes location metadata, generating the combined metadata may comprise comparing the location metadata of the audio object to the location metadata of the video object to determine a correlation value, and generating location metadata of the combined metadata based on a determination of whether the correlation value exceeds a confidence threshold.

Moreover, various aspects of the techniques may provide for a device comprising means for obtaining an audio object, means for obtaining a video object, associating the audio object and the video object, means for comparing the audio object to the associated video object and means for render the audio object based on the comparison between the audio object and the associated video object.

Additionally, the means for comparing the audio object to the associated video object may comprise means for generating, at least in part, combined metadata comprising one or more of a size and a location.

Also, when the audio object includes location metadata and the video object includes location metadata, the means for generating the combined metadata may comprise means for comparing the location metadata of the audio object to the location metadata of the video object to determine a correlation value, and means for generating location metadata of the combined metadata based on a determination of whether the correlation value exceeds a confidence threshold.

In some instances, a non-transitory computer-readable storage medium having stored thereon instructions that, when executed, cause one or more processors to obtain an audio object, obtain a video object, associate the audio object and the video object, compare the audio object to the associated video object and render the audio object based on the comparison between the audio object and the associated video object.

Various aspects of the techniques described in this disclosure may also be performed by a device that generates an audio output signal. The device may comprise means for identifying a first audio object associated with a first video object counterpart based on a first comparison of a data component of the first audio object and a data component of the first video object, and means for identifying a second audio object not associated with a second video object counterpart based on a second comparison of a data component of the second audio object and a data component of the second video object. The device may additionally comprise means for rendering the first audio object in a first zone, means for rendering the second audio object in a second zone, and means for generating the audio output signal based on combining the rendered first audio object in the first zone and the rendered second audio object in the second zone. The various means described herein may comprise one or more processors configured to perform the functions described with respect to each of the means.

In some instances, the data component of the first audio object comprises one of a location and a size. In some instances, the data component of the first video object data comprises one of a location and a size. In some instances, the data component of the second audio object comprises one of a location and a size. In some instances, the data component of the second video object comprises one of a location and a size.

In some instances, the first zone and second zone are different zones within an audio foreground or different zones within an audio background. In some instances, the first zone and second zone are a same zone within an audio foreground or a same zone within an audio background. In some instances, the first zone is within an audio foreground and the second zone is within an audio background. In some instances, the first zone is within an audio background and the second zone is within an audio foreground.

In some instances, the data component of the first audio object, the data component of the second audio object, the data component of the first video object, and the data component of the second video object each comprises metadata.

In some instances, the device further comprises means for determining whether the first comparison is outside a confidence interval, and means for weighting the data component of the first audio object and the data component of first video object based on the determination of whether the first comparison is outside the confidence interval. In some instances, the means for weighting comprises means for averaging the data component of the first audio object data and the data component of the first video object.

In some instances, the device may also means for allocating a different number of bits based on one or more of the first comparison and the second comparison.

In some instances, the techniques may provide for a non-transitory computer-readable storage medium having stored thereon instructions that, when executed, cause one or more processors to identify a first audio object associated with a first video object counterpart based on a first comparison of a data component of the first audio object and a data component of the first video object, identify a second audio object not associated with a second video object counterpart based on a second comparison of a data component of the second audio object and a data component of the second video object, render the first audio object in a first zone, means for rendering the second audio object in a second zone, and generate the audio output signal based on combining the rendered first audio object in the first zone and the rendered second audio object in the second zone.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware Various embodiments of the techniques have been described. These and other embodiments are within the scope of the following claims.

The invention claimed is:

1. A method of generating multi-channel audio data, the method comprising:

analyzing audio data captured with a device, wherein analyzing the audio data comprises performing auditory scene analysis of the audio data to identify one or more audio objects and generate audio metadata describing the one or more audio objects;

analyzing video data captured with the device concurrent to the capture of the audio data, wherein analyzing the video data comprises performing visual scene analysis of the video data to identify one or more video objects and generate video metadata describing the one or more video objects, the audio metadata and the video metadata using a common format;

associating at least one of the one or more audio objects with at least one of the one or more video objects; and generating the multi-channel audio data from the audio data based on the association of the at least one of the one or more audio objects with the at least one of the one or more video objects by, at least in part, adjusting, when rendering the at least one of the audio objects, a diffuseness of the at least one of the audio objects based on a level of correlation between the audio metadata describing the at least one of the audio objects and the video metadata describing the associated one of the video objects.

2. The method of claim 1, wherein the audio metadata comprises one or more of a location, a shape, a speed, and a location confidence level of the corresponding audio object, and wherein the video metadata comprises one or more of a location, a shape, a speed, and a location confidence level of the corresponding audio object.

3. The method of claim 1, wherein associating the at least one of the one or more audio objects with the at least one of the one or more video objects comprises:

classifying each of the one or more audio objects as a type of audio object;

classifying each of the one or more video objects as a type of video object;

determining that the type of the at least one of the audio objects is the same type as the at least one of the video objects; and in response to the determination that the type of the at least one of the one or more audio object is the same as the type of the at least one of the one or more video object, associating the at least one of the one or more audio objects with the at least one of the one or more video objects.

4. The method of claim 1, wherein generating the multi-channel audio data comprises:

determining the level of correlation between the audio metadata of the at least one of the one or more audio objects and the video metadata of the at least one of the one or more video objects associated with the at least one of the one or more audio objects;

generating combined metadata for the at least one of the one or more audio objects to which the at least one of the one or more video objects is associated based on the determined level of correlation;

adjusting the diffuseness of the at least one of the audio objects based on the level of correlation; and rendering the at least one of the one or more audio objects in one or more foreground channels of the multi-channel audio data based on the combined metadata generated for the at least one of the one or more audio objects.

5. The method of claim 1, wherein the at least one of the one or more audio objects comprises a first one of the one or more audio objects, wherein the method further comprises determining that a second one of the one or more audio objects is not associated with any one of the one or more video objects, and wherein generating the multi-channel audio data comprises generating the multi-channel audio data so that the second one of the audio objects originates in one or more background channels of the multi-channel audio data.

6. The method of claim 5, wherein generating the multi-channel audio data comprises generating the multi-channel audio data so that the second one of the audio objects originates as a diffuse audio object in the one or more background channels of the multi-channel audio data.

7. The method of claim 1, wherein the at least one of the one or more video objects comprises a first one of the one or more video objects, wherein the method further comprises:

determining that a second one of the one or more of the video objects is not associated with any one of the one or more audio objects;

in response to determining that the second one of the one or more of the video objects is not associated with any one of the one or more audio objects, retrieving a reference audio object from an audio library that would have been associated with the second one of the one or more video objects; and rendering the reference audio object based on the second one of the one or more video objects to generate at least a portion of the multi-channel audio data.

8. The method of claim 1, wherein the audio metadata is defined in a textual format common to the textual format used to define the video metadata.

9. The method of claim 1, wherein generating the multi-channel audio data comprises:

determining the level of correlation as a function of a percentage difference between the audio metadata describing the at least one of the audio objects and the video metadata describing the associated one of the video objects; and rendering the at least one of the audio object as a diffuse audio object spread across multiple channels of the multi-channel audio data when the determined level of correlation is outside a confidence interval.

10. The method of claim 1, performed on a mobile phone.

11. A non-transitory computer-readable storage medium having stored thereon instructions that, when executed cause one or more processors of a device to:

analyze audio data captured with the device, wherein analyzing the audio data comprises performing auditory scene analysis of the audio data to identify one or more audio objects and generate audio metadata describing the one or more audio objects;

analyze video data captured with the device concurrent to the capture of the audio data, wherein analyzing the video data comprises performing visual scene analysis of the video data to identify one or more video objects and generate video metadata describing the one or more video objects, the audio metadata and the video metadata using a common format;

associate at least one of the one or more audio objects with at least one of the one or more video objects; and generate multi-channel audio data from the audio data based on the association of the at least one of the one or more audio objects with the at least one of the one or more video objects by, at least in part, adjusting, when rendering the at least one of the audio objects, a diffuseness of the at least one of the audio objects based on a level of correlation between the audio metadata describing the at least one of the audio objects and the video metadata describing the associated one of the video objects.

12. A device configured to generate multi-channel audio data, the device comprising:
a memory configured to store audio data; and
one or more processors configured to analyze the audio data by, at least in part, performing auditory scene analysis of the audio data to identify an audio object and generate audio metadata describing the audio object, analyze video data by, at least in part, performing visual scene analysis of the video data to identify a video object and generate video metadata describing the video object, associate the audio object and the video object, and generate the multi-channel audio data from the audio data based on the association of the audio object to the video object by, at least in part, adjusting, when rendering the at least one of the audio objects, a diffuseness of the at least one of the audio objects based on a level of correlation between the audio metadata describing the audio object and the video metadata describing the video object.

13. The device of claim 12, wherein the audio metadata comprises a size of the audio object and a location of the audio object.

14. The device of claim 12, wherein the video metadata comprises a size of the video object and location of the video object.

15. The device of claim 12, wherein the one or more processors are configured to generate, at least in part, combined metadata comprising one or more of a size and a location.

16. The device of claim 15,
wherein the audio metadata includes location metadata,
wherein the video metadata includes location metadata,
wherein generating the combined metadata comprises:
comparing the location metadata of the audio metadata to the location metadata of the video metadata to determine the level of correlation;
generating location metadata of the combined metadata based on a determination of whether the level of correlation exceeds a confidence threshold.

17. The device of claim 12
wherein the audio object comprises a first audio object,
wherein the video object comprises a first video object,
wherein the one or more processors are configured to:
identify the first audio object associated with the first video object counterpart based on a first comparison of a data component of the first audio object and a data component of the first video object;
identify a second audio object not associated with a second video object counterpart based on a second comparison of a data component of the second audio object and a data component of the second video object, and
wherein the processors are further configured to:
render the first audio object in a first zone;
render the second audio object in a second zone; and
generate the audio output signal based on combining the rendered first audio object in the first zone and the rendered second audio object in the second zone.

18. The device of claim 17, wherein the data component of the first audio object comprises one of a location and a size.

19. The device of claim 17, wherein the data component of the first video object data comprises one of a location and a size.

20. The device of claim 17, wherein the data component of the second audio object comprises one of a location and a size.

21. The device of claim 17, wherein the data component of the second video object comprises one of a location and a size.

22. The device of claim 17, wherein the first zone and second zone are different zones within an audio foreground or different zones within an audio background.

23. The device of claim 17, wherein the first zone and second zone are a same zone within an audio foreground or a same zone within an audio background.

24. The device of claim 17, wherein the first zone is within an audio foreground and the second zone is within an audio background.

25. The device of claim 17, wherein the first zone is within an audio background and the second zone is within an audio foreground.

26. The device of claim 17, wherein the one or more processors are further configured to:
determine whether the first comparison is outside a confidence interval; and
weight the data component of the first audio object and the data component of first video object based on the determination of whether the first comparison is outside the confidence interval.

27. The device of claim 26, wherein the one or more processors are configured to average the data component of the first audio object data and the data component of the first video object.

28. The device of claim 17, wherein the one or more processors are further configured to allocate a different number of bits based on one or more of the first comparison and the second comparison.

* * * * *